United States Patent
Michishita

(10) Patent No.: US 7,852,055 B2
(45) Date of Patent: Dec. 14, 2010

(54) SWITCHING REGULATOR

(75) Inventor: Yuusuke Michishita, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 365 days.

(21) Appl. No.: 12/068,930

(22) Filed: Feb. 13, 2008

(65) Prior Publication Data
US 2008/0197828 A1  Aug. 21, 2008

(30) Foreign Application Priority Data
Feb. 16, 2007  (JP) .............................. 2007-035965

(51) Int. Cl.
G05F 1/40 (2006.01)
(52) U.S. Cl. .................................... 323/282
(58) Field of Classification Search .............. 323/271, 323/277, 282, 283, 285, 351
See application file for complete search history.

(56) References Cited

U.S. PATENT DOCUMENTS

| | | | | |
|---|---|---|---|---|
| 5,568,044 A * | 10/1996 | Bittner | ..................... | 323/272 |
| 6,229,289 B1 * | 5/2001 | Piovaccari et al. | .......... | 323/268 |
| RE37,609 E * | 3/2002 | Bittner | ..................... | 323/272 |
| 7,446,519 B2 * | 11/2008 | Low et al. | ................... | 323/285 |
| 7,598,715 B1 * | 10/2009 | Hariman et al. | ............. | 323/271 |
| 7,679,350 B2 * | 3/2010 | Falvey et al. | ................. | 323/284 |
| 2008/0174286 A1 * | 7/2008 | Chu et al. | .................... | 323/271 |
| 2008/0284398 A1 * | 11/2008 | Qiu et al. | .................... | 323/283 |
| 2009/0108820 A1 * | 4/2009 | Mirea | ......................... | 323/271 |
| 2009/0167267 A1 * | 7/2009 | Dwarakanath et al. | ...... | 323/282 |
| 2009/0322299 A1 * | 12/2009 | Michishita et al. | .......... | 323/282 |

FOREIGN PATENT DOCUMENTS

JP  2003-219637  7/2003

* cited by examiner

*Primary Examiner*—Adolf Berhane
(74) *Attorney, Agent, or Firm*—Dickstein Shapiro LLP

(57) ABSTRACT

A switching regulator includes a switching transistor to switch in accordance with an input control signal, an inductor charged with an input voltage in response to a switching operation by the switching transistor, a switch signal generator to detect an inductor current flowing through the inductor from a voltage at a connection point between the switching transistor and the inductor and output a predetermined switch signal after a time in accordance with the input voltage when detecting the inductor current is zero, and a controller to perform a PWM control or a PFM control on the switching transistor in accordance with the switch signal output from the switch signal generator to keep an output voltage output from the output terminal at a predetermined constant voltage. The controller performs the PFM control when the predetermined switch signal is continuously input thereto from the switch signal generator one or more times.

5 Claims, 5 Drawing Sheets

SWITCHING REGULATOR

CROSS-REFERENCE TO RELATED APPLICATION

The present patent application claims priority under 35 U.S.C. §119 from Japanese Patent Application No. 2007-035965, filed on Feb. 16, 2007 in the Japan Patent Office, the entire contents and disclosure of which are hereby incorporated by reference herein.

BACKGROUND OF THE INVENTION

1. Field of the Invention

Preferred embodiments of the present invention generally relate to a switching regulator, and more particularly, to a switching regulator configured to be operated in a PWM control mode or a PFM or VFM control mode according to a load connected to an output terminal of the switching regulator.

2. Discussion of the Related Art

Recently, environmental concerns have resulted in increased demand for power savings in the use of electronic devices. This demand is particular acute for battery-powered electronic devices.

In general, in order to save power, it is important to reduce power consumed by an electronic device and eliminate wasted power consumption by improving efficiency of a power supply circuit.

As a high-efficiency power supply circuit used for a small electronic device, a non-isolated switching regulator employing an inductor is widely used, for which three control modes, a PWM (Pulse Width Modulation) control mode, a PFM (Pulse Frequency Modulation) control mode, and a VFM (Variable Frequency Modulation) control mode, are commonly known.

In the PWM control mode, an output voltage output from a switching regulator is controlled to be constant by varying a duty cycle of a clock pulse having a constant frequency.

In the PFM control mode, an output voltage output from a switching regulator is controlled to be constant by varying a frequency of a clock pulse having a constant pulse width.

In the VFM control mode, an output voltage output from a switching regulator is controlled to be constant by controlling an output of a clock pulse having a constant pulse width in accordance with an error in the output voltage.

More precisely, the PFM control mode employs two methods, a method to vary the frequency of the clock pulses steplessly and a method to vary the frequency of the clock pulse artificially by thinning out the clock pulses having the constant frequency used in the PWM control mode.

Since the PWM control mode performs an on-off control on a switching transistor at a constant frequency even when a load connected to a switching regulator is light, efficiency in driving a light load to which a low current is supplied with the PWM control mode decreases. On the other hand, in the PFM or VFM control mode, a frequency of a signal for switching the switching transistor varies in accordance with a load connected to a switching regulator. As a result, even though noise or voltage ripple affects the load substantially, the PFM or VFM control modes drive a light load more efficiently than the PWM control mode does.

Conventionally, by switching a control mode of the switching transistor between the PWM control mode and the PFM control mode or between the PWM control mode and the VFM control mode in controlling a switching regulator in accordance with a load condition connected thereto, efficiency in supplying power increases irrespective of light and heavy loads.

As for a method to detect a load condition required for such control, a method to detect an output current from an output terminal by inserting an output current detection resistor between a power supply as an input voltage and the output terminal is generally used. However, in such a method, since power loss at the output current detection resistor increases as the output current increases, the method is not appropriate for a small electronic device using a battery as a power supply.

In order to solve the above problem, for example, another method that does not employ an output current detection resistor has been proposed. In this method, a load condition is indirectly detected by using a voltage level of an error amplifier.

However, such a technique has a drawback in that an output current to determine the control mode cannot be measured correctly due to an integration circuit included in the error amplifier. Normally, in order to remove an effect of a ripple component superimposed on an output voltage, an integration circuit is added to an error amplifier as a phase compensator.

In general, the integration circuit is optimized to an operation frequency in the PWM control mode. On the other hand, in the PFM control mode, the integration circuit effectively functions right after the control mode is changed. However, when an operation frequency of the PFM control mode is set lower than in the PWM control mode or is lowered by thinning out several clock pulses from clock pulses for the PWM control mode and an on/off operation by a switching transistor is interrupted due to the lower frequency, since an output voltage from the integration circuit is also an output voltage from the error amplifier, the output voltage from the error amplifier becomes zero or close to the input voltage, and the integration circuit does not work effectively as a circuit for detecting an output current. As a result, in the PFM control mode, the error amplifier cannot keep a constant output voltage with respect to the output current, and a relation between the output voltage from the error amplifier and the output current cannot be kept constant either.

Consequently, a problem arises in that the output current to determine the control mode can be measured in the above method less accurately than in the method using the output current detection resistor.

SUMMARY OF THE INVENTION

The present invention describes a novel switching regulator, which, in one preferred embodiment, includes a switching transistor to switch in accordance with an input control signal, an inductor to be charged with an input voltage in response to a switching operation by the switching transistor, a switch signal generator configured to detect an inductor current flowing through the inductor from a voltage at a connection point between the switching transistor and the inductor and output a predetermined switch signal after a time in accordance with the input voltage when detecting the inductor current is zero, and a controller configured to perform a PWM control or a PFM control on the switching transistor in accordance with the switch signal output from the switch signal generator to keep an output voltage output from the output terminal at a predetermined constant voltage, wherein the controller performs the PFM control when the predetermined switch signal is continuously input thereto from the switch signal generator one or more times.

The present invention further describes a novel switching regulator, which, in one preferred embodiment, a switching regulator as described above employs a VFM control mode instead of a PFM control mode.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
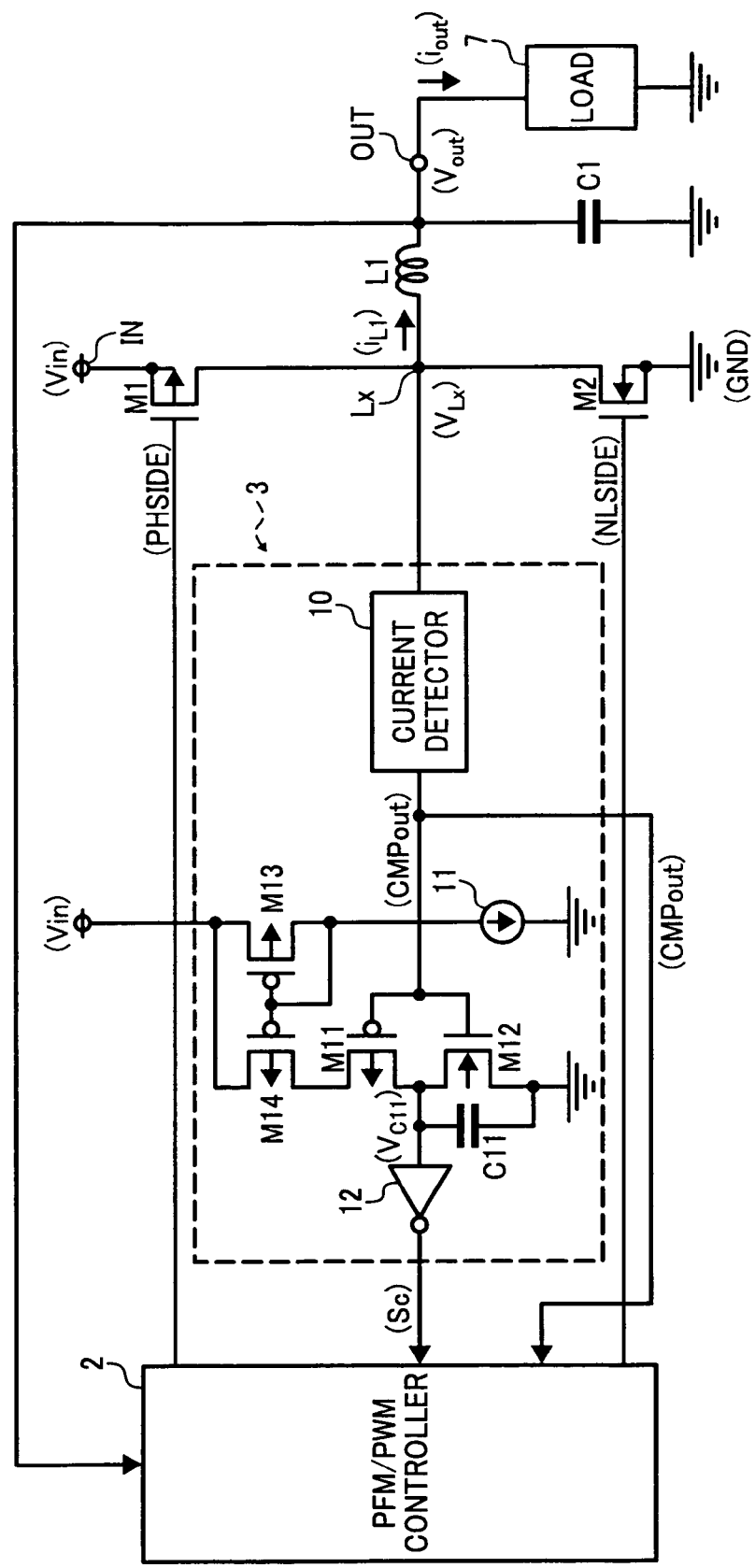
FIG. 1 is a diagram showing example circuitry of a switching regulator of a first embodiment according to the present invention.

In describing preferred embodiments illustrated in the drawings, specific terminology is employed solely for the sake of clarity. It should be noted that the present invention is not limited to any preferred embodiment described in the drawings, and the disclosure of this patent specification is not intended to be limited to the specific terminology so selected. It is to be understood that each specific element includes all technical equivalents that operate in a similar manner and achieve a similar result.

Referring now to the drawings, wherein like reference numerals designate identical or corresponding parts throughout the several views, preferred embodiments of the present invention are described.

Referring to FIG. 1, a description is given of a switching regulator according to a preferred embodiment of the present invention.

FIG. 1 shows example circuitry of a switching regulator of a first embodiment according to the present invention. In FIG. 1, a switching regulator 1 is a non-isolated switching regulator employing an inductor and is configured to convert an input voltage $V_{in}$ that is supplied to an input terminal IN into a predetermined constant voltage and output the constant voltage as an output voltage $V_{out}$ from an output terminal OUT to a load 7.

The switching regulator 1 includes a switching transistor M1 formed of a PMOS transistor, a synchronous rectification transistor M2 formed of an NMOS transistor, a PFM/PWM controller 2, a switch signal generator 3, a capacitor C1, and an inductor L1. The switching transistor M1 and the synchronous rectification transistor M2 are configured to perform a switching operation for controlling output of the input voltage $V_{in}$. The switch signal generator 3 generates and outputs a switch signal Sc for switching an operation of the PFM/PWM controller 2. The switch signal generator 3 includes a current detector 10, a PMOS transistor M11 and an NMOS transistor M12 that form an inverter, a constant current source 11, PMOS transistors M13 and M14 that form a current mirror circuit, a capacitor C11, and an inverter 12. The current detector 10 detects a current $i_{L1}$ flowing through the inductor L1 and outputs a CMPout signal of a low level when the current $i_{L1}$ is zero.

The PFM/PWM controller 2 and the switch signal generator 3 form a control circuit and a switch signal generation circuit, respectively. The constant current source 11, the inverter 12, the capacitor C11, the PMOS transistors M11, M13 and M14, and the NMOS transistor M12 form a signal generation circuit. The PMOS transistor M11 and the NMOS transistor M12 form an inverter. The constant current source 11, the PMOS transistors M13 and M14 form a constant-current circuit. The inverter 12 forms a binarization circuit. In the switching regulator 1, every element other than the inductor L1 and the capacitor C1 can be integrated onto one integrated circuit (IC). Alternatively, in the switching regulator 1, every element other than the switching transistor M1, the synchronous rectification transistor M2, the inductor L1, and the capacitor C1 can be integrated onto one IC.

The switching transistor M1 and the synchronous rectification transistor M2 are connected in series between the input terminal IN and ground. The inductor L1 is connected between the output terminal OUT and a connection point Lx of the switching transistor M1 and the synchronous rectification transistor M2. The capacitor C1 is connected between the output terminal OUT and ground. Each gate of the switching transistor M1 and the synchronous rectification transistor M2 is connected to the PFM/PWM controller 2.

The output voltage $V_{out}$ is also input to the PFM/PWM controller 2. The PFM/PWM controller 2 compares a predetermined reference voltage that is generated therein with a divided voltage that is obtained by dividing the output voltage $V_{out}$, and controls switching operations of the switching transistor M1 and the synchronous rectification transistor M2 such that the divided voltage becomes equal to the reference voltage.

In the switching operation control, the PFM/PWM controller 2 selects any one of a PFM control mode and a PWM control mode in accordance with the switch signal Sc input from the switch signal generator 3, and outputs a control signal PHSIDE to a gate of the switching transistor M1 and a control signal NLSIDE to a gate of the synchronous rectification transistor M2, respectively, depending on the selected control mode.

In the switch signal generator 3, a voltage $V_{Lx}$ at the connection point Lx is input to the current detector 10. The current detector 10 outputs a binary CMPout signal to each gate of the PMOS transistor M11 and the NMOS transistor M12. Each source of the PMOS transistors M13 and M14 is connected to the input voltage $V_{in}$. Gates of the PMOS transistors M13 and M14 are connected to each other and the connection point is connected to a drain of the PMOS transistor M13. As noted above, the PMOS transistors M13 and M14 form a current mirror circuit. The constant current source 11 is connected between the drain of the PMOS transistor M13 and ground. The PMOS transistor M11 and the NMOS transistor M12 are connected in series between a drain of the PMOS transistor M14 and ground. The capacitor C11 is connected in parallel with the NMOS transistor M12. The connection point between the PMOS transistor M11 and the NMOS transistor M12 is connected to an input terminal of the inverter 12. The inverter 12 outputs the switch signal Sc from an output terminal thereof.

In the above-described configuration, the switching regulator 1 has two operation modes, a continuity mode and a discontinuity mode.

In the continuity mode, a large current is supplied to the inductor L1 when the switching transistor M1 is turned on, and an output current $i_{out}$ output from the output terminal OUT to the load 7 is also large. As a large amount of energy is stored at the inductor L1, the inductor L1 can supply the current $i_{out}$ to the load 7 even when the switching transistor M1 is switched off.

Figure 2:
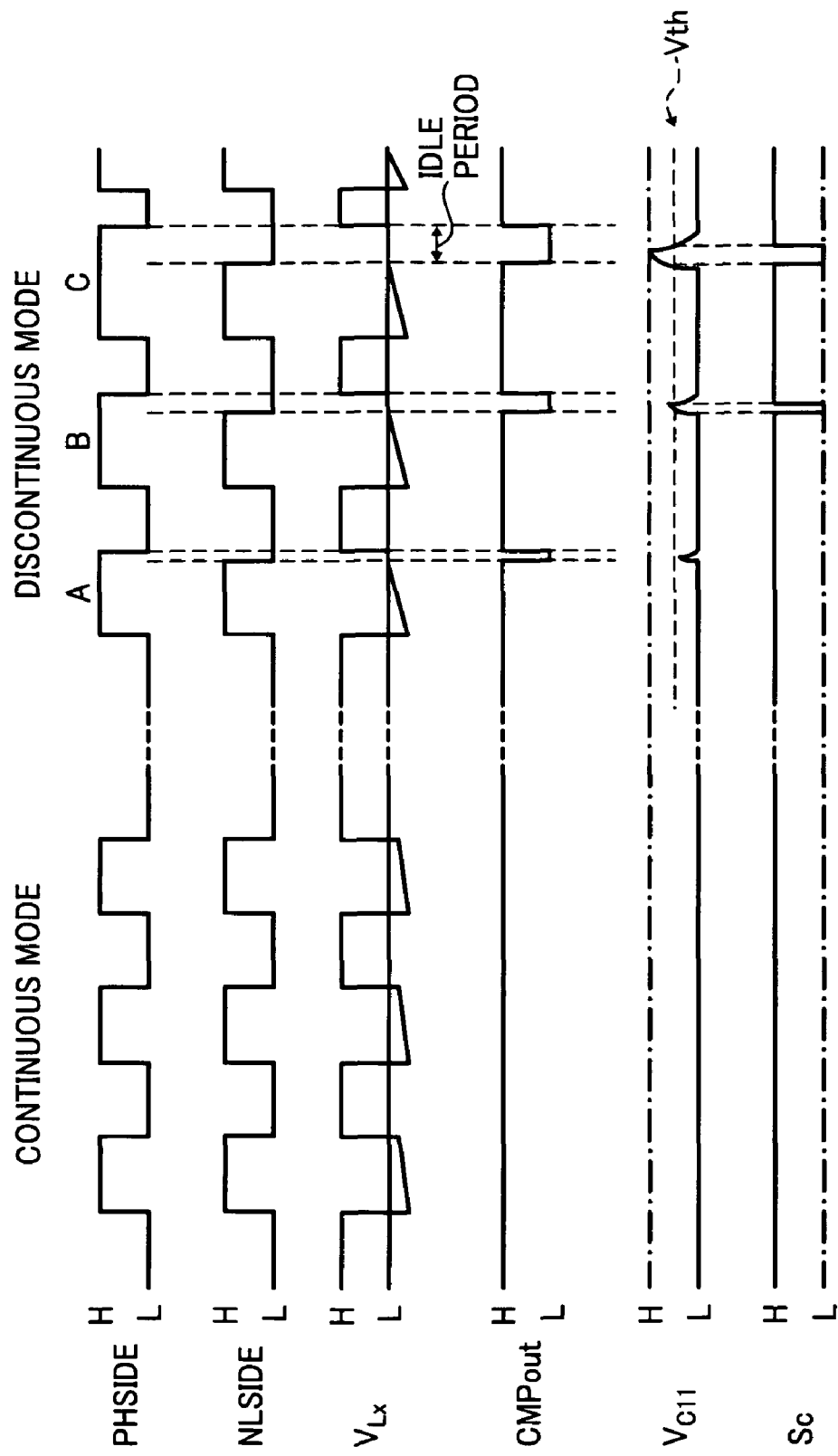
FIG. 2 is a graph showing an example waveform of each element of the switching regulator shown in FIG. 1 in a continuity mode and a discontinuity mode.

FIG. 2 shows a diagram showing an example pulse waveform of each of the control signals NLSIDE and PHSIDE, the voltage $V_{Lx}$, the CMPout signal, a voltage $V_{C11}$, which is a voltage determined by an amount of electrical charge stored in the capacitor C11, and the switch signal Sc.

The continuity mode is explained first.

In the continuity mode, since the control signal PHSIDE and the control signal NLSIDE have the same phase, the synchronous rectification transistor M2 is switched off or on (the control signal NLSIDE is in a low level or a high level) while the switching transistor M1 is switched on or off (the control signal PHSIDE is in a low level or a high level). When the switching transistor M1 is switched on, the voltage $V_{Lx}$ at the connection point Lx becomes positive (switches to a high level). Alternatively, when the switching transistor M1 is switched off, the voltage $V_{Lx}$ drops to a negative voltage (a low level) due to counter-electromotive force of the inductor L1. However, at this point, when the synchronous rectification transistor M2 is switched on, the voltage $V_{Lx}$ is clamped at a voltage slightly lower than ground. In this state, until the switching transistor M1 is switched on, the energy stored at the inductor L1 is supplied to the output terminal OUT from ground through the inductor L1. Thus, the output current $i_{out}$ is continuously supplied to the load 7 through the inductor L1.

The discontinuity mode is explained next.

When the output current $i_{out}$ becomes smaller, the inductor current $i_{L1}$ flowing through the inductor L1 also becomes smaller. Thus, energy stored at the inductor L1 becomes smaller as well. As a result, during a time period from a time the switching transistor M1 is switched off to a time the switching transistor M1 is switched on in a next period, the energy stored at the inductor L1 is all discharged, and the voltage $V_{Lx}$ becomes zero. When the voltage $V_{Lx}$ becomes zero, the electrical charge stored in the capacitor C1 connected to the output terminal OUT may be discharged to ground through the inductor L1 and the synchronous rectification transistor M2. Thus, the efficiency of the switching regulator 1 may decrease markedly.

At this point, the current detector 10 detects that the voltage $V_{Lx}$ is zero and determines that the inductor current $i_{L1}$ is also zero. Then, the current detector 10 inverts a pulse level of the CMPout signal to a low level. When the PFM/PWM controller 2 receives the CMPout signal of the low level from the current detector 10, the PFM/PWM controller 2 turns the control signal NLSIDE to the low level in order to turn off the synchronous rectification transistor M2. As a result, the electrical charge stored in the capacitor C1 cannot be discharged to ground through the inductor L1 and the synchronous rectification transistor M2, thereby enabling the switching regulator 1 to avoid an efficiency decrease due to a reverse current.

A time period from a time the inductor current iL1 becomes zero to a time the switching transistor M1 is turned on in a next period is referred to as an idle period. In the discontinuity mode, one frame operation of the switching regulator 1 is formed of a time period for which the switching transistor M1 is turned on, a time period for which the synchronous rectification transistor M2 is turned on, and the idle period. A time the discontinuity mode starts is determined by the output current $i_{out}$, and the idle period varies depending on the input voltage $V_{in}$ and the output current $i_{out}$.

When the switching transistor M1 is turned on, the inductor current $i_{L1}$ is proportional to $(V_{in}-V_{out})$, and when the switching transistor M1 is turned off, the inductor current $i_{L1}$ is proportional to $(-V_{out})$. Thus, as the input voltage $V_{in}$ increases, more energy can be stored at the inductor L1 even in a shorter time. As a result, a time period from a time the synchronous transistor M2 is turned on to a time the inductor current iL1 becomes zero (the time period for which the synchronous rectification transistor M2 is turned on) becomes longer. That is, the idle period becomes shorter. On the other hand, the idle period becomes shorter or longer when the output current $i_{out}$ becomes larger or smaller. As described above, based on a relation that the idle period varies according to the input voltage $V_{in}$ and the output current $i_{out}$, the control mode of the switching regulator 1 is switched.

The current detector 10 outputs the CMPout signal of the low level while the inductor current $i_{L1}$ is zero or the CMPout signal of the high level while the inductor current $i_{L1}$ is not zero. In FIG. 1, when the CMPout signal switches to the low level, the PMOS transistor M11 is turned on, and at the same time, the NMOS transistor M12 is turned off. Thus, the capacitor C11 is charged through the PMOS transistor M11 with a constant current obtained by generating based on a constant current supplied from the constant current source 11 at the current mirror circuit formed of the PMOS transistors M13 and M14.

On the other hand, when the CMPout signal is in the high level, that is, while the inductor current $i_{L1}$ is not zero, the PMOS transistor M11 is turned off, and at the same time, the NMOS transistor M12 is turned on. Then, the electrical charge stored in the capacitor C11 is discharged through the NMOS transistor M12. When the voltage $V_{C11}$ determined by the size of the electrical charge stored in the capacitor C11 becomes higher than a threshold voltage $V_{th}$ of the inverter 12, the inverter 12 outputs the switch signal Sc of a low level to the PFM/PWM controller 2. When the voltage $V_{C11}$ is lower than or equal to the threshold voltage $V_{th}$, the inverter 12 outputs the switch signal Sc of a high level to the PFM/PWM controller 2.

When continuously receiving the switch signal Sc of the low level one or more times, the PFM/PWM controller 2 changes the control mode of the switching regulator 1 from the PWM control mode to the PFM control mode. For example, when the threshold voltage $V_{th}$ is $V_{in}/2$ and the capacitor C11 is charged with the generated constant current, as the input voltage $V_{in}$ increases, a time period required for the voltage $V_{C11}$ to exceed the threshold voltage $V_{th}$ becomes longer. That is, a time period for which the switch signal Sc switches to the low level thereof after the CMPout signal has switched to the low level thereof becomes longer. On the contrary, as the input voltage $V_{in}$ decreases, the time period for which the switching signal Sc switches to the low level thereof after the CMPout signal has switched to the low level thereof becomes shorter.

More specifically, as shown in FIG. 2, in a frame A, the idle period is not long enough to charge the capacitor C11 beyond the threshold voltage $V_{th}$. Thus, the switch signal Sc does not switch to the low level. In a frame B or C, the idle period is long enough to charge the capacitor C11 beyond the threshold voltage $V_{th}$, and the switch signal Sc switches to the low level. Alternatively, even if the idle period is short such as in the frame A, when the threshold voltage $V_{th}$ is set lower or the input voltage $V_{in}$ is lower, the capacitor C11 may be charged beyond the threshold voltage $V_{th}$ with the same generated constant current in the same idle period as the frame A, and the switch signal may switch to the low level. By contrast, even if the idle period is long such as in the frame B or C, when the threshold voltage $V_{th}$ is set higher or the input voltage $V_{in}$ is higher, the capacitor C11 may not be charged beyond the threshold voltage $V_{th}$ with the same generated constant current in the same idle period as the frame B or C, and the switch signal Sc does not switch to the low level. Furthermore, as described above, the idle period varies depending on the input voltage $V_{in}$ and the output current $i_{out}$. As a result, even if a pulse width of the control signal PHSIDE is predetermined, a time the PFM/PWM controller 2 changes the control mode of the switching regulator 1 from the PWM control mode to the PFM control mode can be modified with the generated constant current according to the input voltage $V_{in}$ and the output current $i_{out}$. Accordingly, in the switching regulator 1 that outputs the constant output voltage $V_{out}$ irrespective of the input voltage Vin, the control mode of the switching regulator 1 can be switched from the PWM control to the PFM control with the generated constant current.

A time the control mode of the switching regulator 1 is switched from the PFM control mode to the PWM control mode can be determined according to a purpose of use of the switching regulator 1. For example, when the switch signal Sc of the low level is not detected in a next frame, when the switch signal Sc of the low level is not detected for a predetermined number of frames, or when the switch signal Sc of the low level is detected after a stop of detection of the switch signal Sc of the low level for a predetermined number of frames from a frame in which the switch signal Sc of the low level is detected, the PFM/PWM controller may switch the control mode of the switching regulator 1 from the PFM control mode to the PWM control mode.

Figure 3:
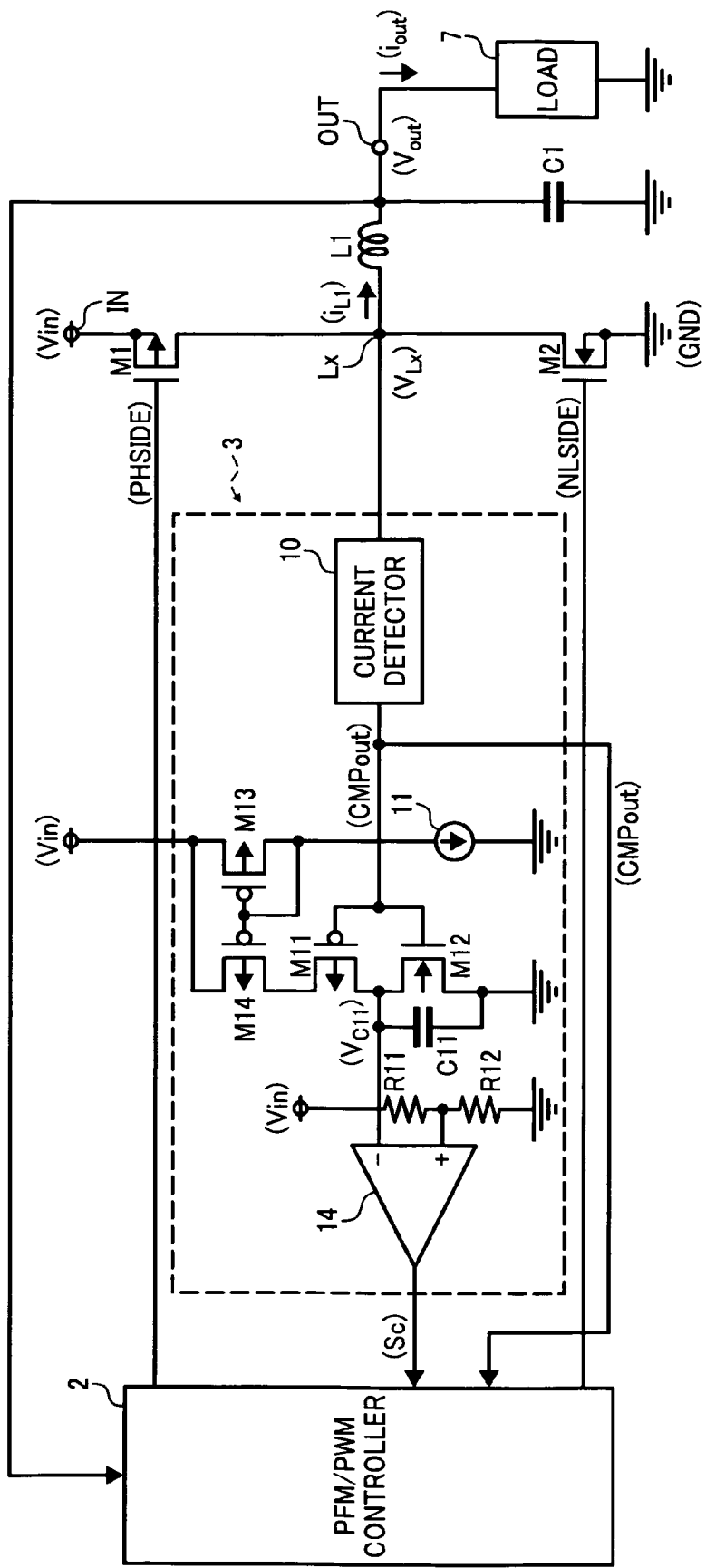
FIG. 3 is a diagram showing other example circuitry of the switching regulator of the first embodiment according to the present invention.

In the switch signal generator 3 shown in FIG. 1, a comparator can be employed instead of the inverter 12. FIG. 3 shows the switch signal generator 3 including a comparator. In FIG. 3, elements identical or equivalent to the elements shown in FIG. 1 are represented by the same reference numerals as in FIG. 1 and a description thereof is omitted herein. A difference between FIGS. 1 and 3 is that resistors R11 and R12 and a comparator 14 are used in FIG. 3 instead of the inverter 12 in FIG. 1.

In FIG. 3, the connection point among the PMOS transistor M11, the NMOS transistor M12, and the capacitor C11 is connected to an inverted terminal of the comparator 14. The resistors R11 and R12 are connected in series between the input voltage $V_{in}$ and ground, and a connection point between the resistors R11 and R12 is connected to a non-inverted terminal of the comparator 14. The constant current source 11, the comparator 14, the resistors R11 and R12, the capacitor C11, the PMOS transistors M11, M13 and M14, and the NMOS transistor M12 form a signal generation circuit. The comparator 14 and the resistors R11 and R12 form a binarization circuit.

The comparator 14 compares the voltage $V_{C11}$, which is a voltage determined by a size of an electrical charge stored in the capacitor C11, with a divided voltage obtained by dividing the input voltage $V_{in}$ with the resistors R11 and R12, and outputs a binary signal representing the comparison result as the switch signal Sc. An inversion threshold voltage of the comparator 14 is determined by a resistance ratio between the resistors R11 and R12. When values of the resistors R11 and R12 are represented as r11 and r12, the inversion threshold voltage is $V_{in} \times r11/(r11+r12)$. The inversion threshold voltage is equivalent to the threshold voltage $V_{th}$ of the inverter 12 in FIG. 1, and the switch signal generator 3 shown in FIG. 3 operates in a similar manner to the switch signal generator 3 shown in FIG. 1.

Figure 4:
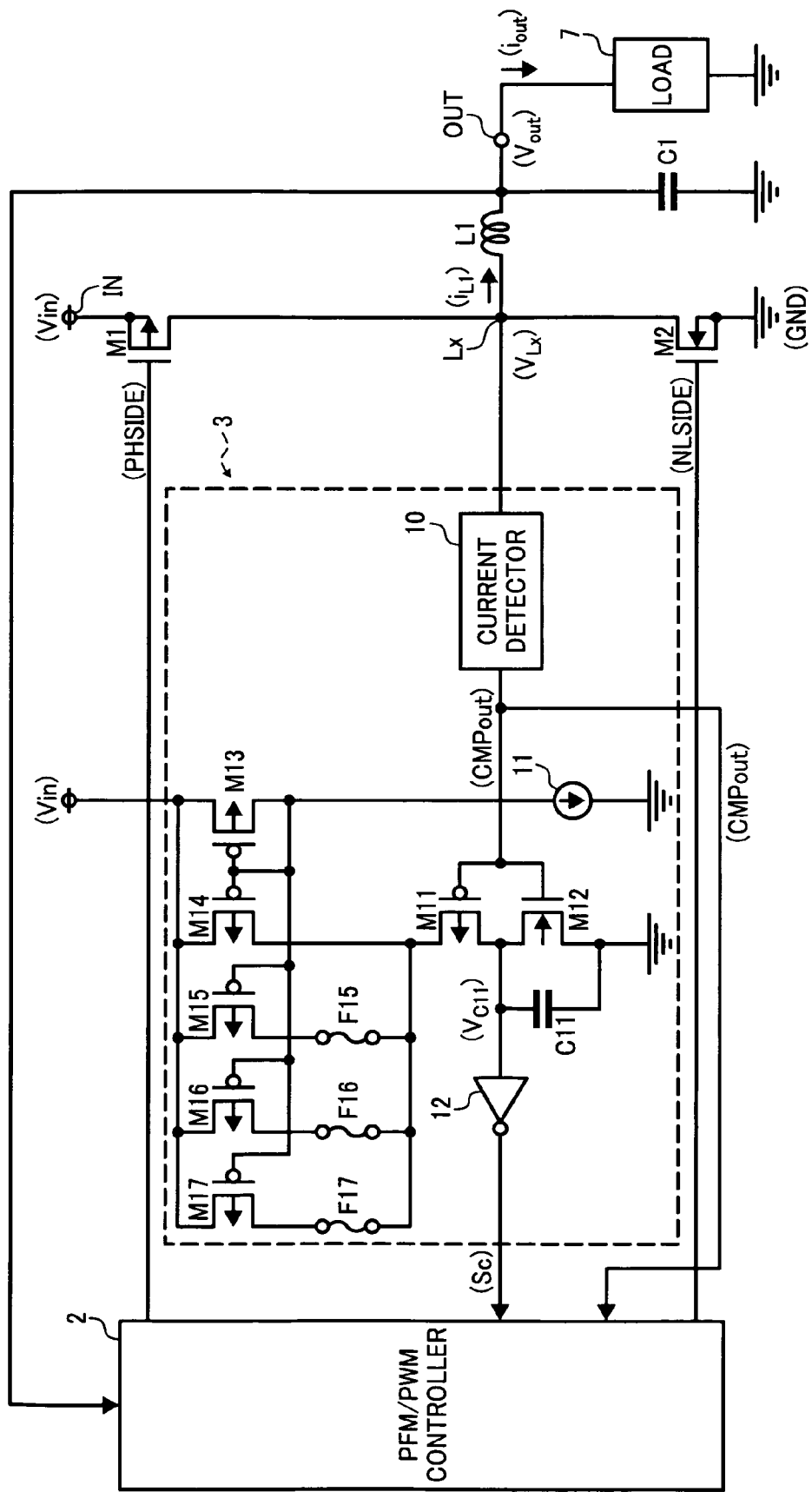
FIG. 4 is a diagram showing other example circuitry of the switching regulator of the first embodiment according to the present invention.

In the switching regulator 1, the capacitor C11 is charged with the predetermined constant current, which is supplied from the constant current source 11 and reflexed at the current mirror circuit formed of the PMQS transistors M13 and M14, through the PMOS transistor M11. At this point, the predetermined constant current can be adjusted according to an inductance L of the inductor L1 or a set value of the output voltage Vout by modifying the configuration of the switching regulator 1 shown in FIG. 1 to an example configuration shown in FIG. 4. In FIG. 4, elements identical or equivalent to the elements shown in FIG. 1 are represented by the same reference numerals as in FIG. 1 and a description thereof is omitted herein. A difference between FIGS. 1 and 4 is that PMOS transistors M15, M16, and M17 and fuses F15, F16, and F17 are added to the switch signal generator 3 shown in FIG. 1.

In FIG. 4, the PMQS transistor M15 and the fuse F15, the PMOS transistor M16 and the fuse F16, and the PMCS transistor M17 and the fuse F17 are connected in series, respectively. Each series circuit is connected to the PMQS transistor M14 in parallel. Each gate of the PMOS transistors M15, M16 and M17 is connected to the connection point between the gates of the PMOS transistors M13 and M14, and the PMOS transistors M13, M14, M15, M16, and M17 form a current mirror circuit. The constant current source 11, the inverter 12, the capacitor C11, the PMOS transistors M11, M13, M14, M15, M16, and M17, and the NMOS transistor M12, and the fuses F15, F16, and F17 form a signal generation circuit. The constant current source 11, the PMOS transistors M13, M14, M15, M16, and M17, and the fuses F15, F16, and F17 form a constant-current circuit.

When the switching transistor M1 is turned on, the inductor current $i_{L1}$ is proportional to $(V_{in}-V_{out})$, and when the switching transistor M1 is turned off, the inductor current $i_{L1}$ is proportional to $(-V_{out})$. Since energy to be stored at the inductor L1 is proportional to a square of the inductor current $i_{L1}$ and the inductance L of the inductor L1, when the input voltage $V_{in}$ and the inductance L vary, the energy to be stored at the inductor L1 also varies for an identical time period for which the switching transistor M1 is turned on. As a result, the idle period varies as well. In the configuration shown in FIG. 4, a value of the constant current to charge the capacitor C11 can be adjusted by selectively trimming several fuses among the fuses F15, F16, and F17. Thus, a timing with which the $V_{C11}$ becomes higher than the threshold voltage $V_{th}$ and the switch signal Sc switches to the low level can be adjusted. Accordingly, the value of the constant current can be set to a desirable value, and a time the PFM/PWM controller changes the control mode of the switching regulator 1 from the PWM control mode to the PFM control mode can also be adjusted.

In the configuration shown in FIG. 4, the three series circuits formed by connecting a PMOS transistor and a fuse in each series circuit are respectively connected to the PMOS transistor M14 in parallel. However, it should be noted that the present invention does not limit the configuration of the switching regulator to the configuration shown in FIG. 4. Thus, alternatively, a configuration in which one or more series circuits formed by connecting a PMOS transistor and a fuse in each series circuit are respectively connected to the PMOS transistor M14 in parallel can be used as well.

In the switching regulator according to the first embodiment, the current detector 10 outputs the CMPout signal of the low level or the high level while the inductor current $i_{Lx}$ is zero or not zero, respectively. When the capacitor C11 is charged with a constant current, as the input voltage $V_{in}$ increases, a time period for which the switching signal Sc switches to the low level thereof after the CMPout signal has switched to the low level thereof becomes longer. By contrast, as the input voltage $V_{in}$ decreases, the time period for which the switching signal Sc switches to the low level thereof after the CMPout signal has switched to the low level thereof becomes shorter. Accordingly, in the switching regulator 1 that outputs the constant output voltage Vout irrespective of the input voltage Vin, the control mode of the switching regulator 1 can be switched from the PWM control to the PFM control with the generated constant current. Furthermore, the control mode of the switching regulator 1 can be switched from the PWM control mode to the PFM control mode according to the load 7 without an output current detection resistor.

In the first embodiment, the capacitor C11 is charged with a predetermined constant current through the PMOS transistor M11. Alternatively, a value of the constant current to be supplied to the capacitor C11 through the PMOS transistor M11 can be adjusted depending on whether the PFM/PWM controller 2 controls the switching regulator 1 with the PFM control mode or with the PWM control mode. A second embodiment according to the present invention describes the above-described configuration.

Figure 5:
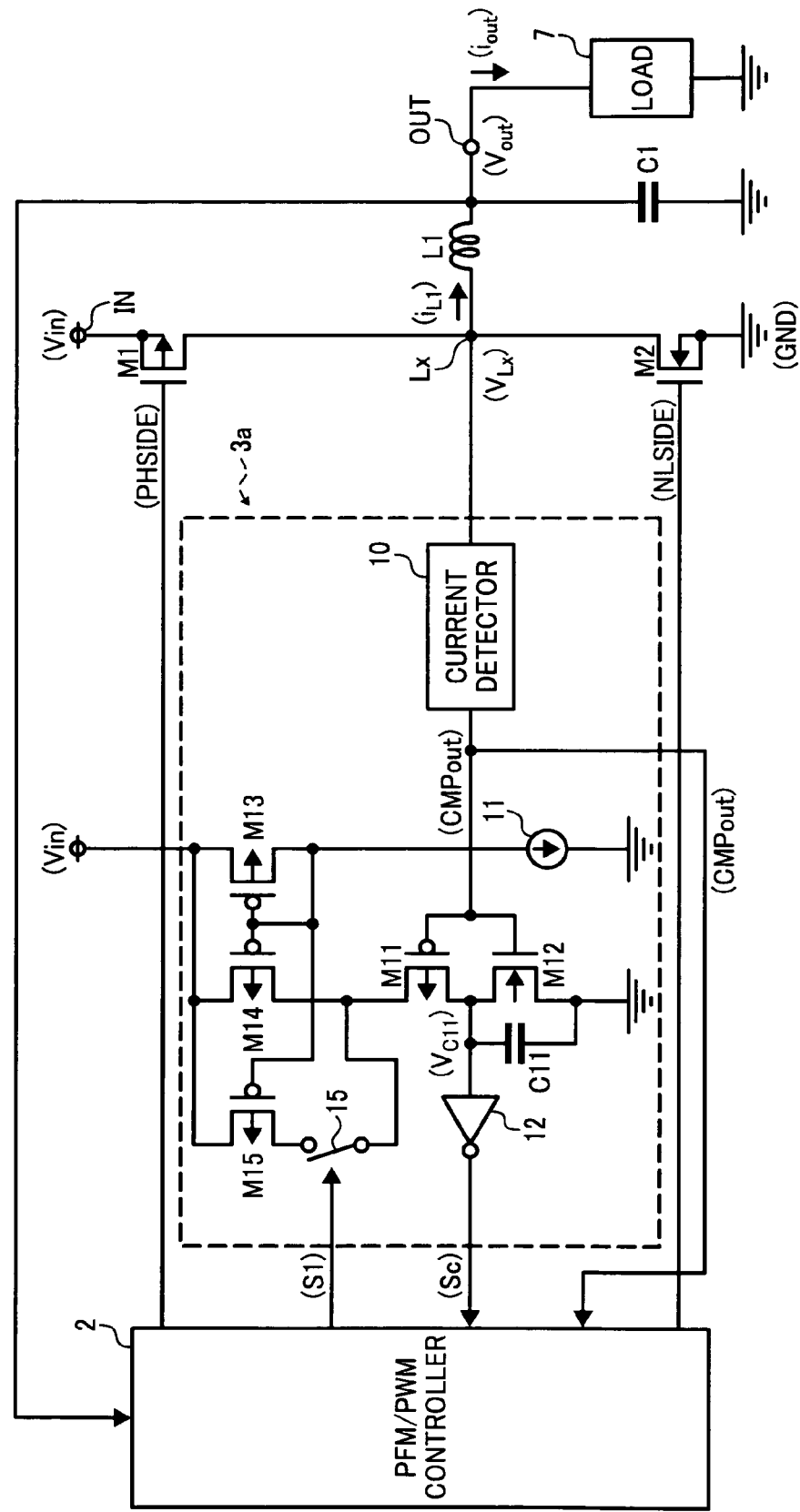
FIG. 5 is a diagram showing example circuitry of a switching regulator of a second embodiment according to the present invention.

FIG. 5 shows example circuitry of a switching regulator of the second embodiment according to the present invention. In FIG. 5, elements identical or equivalent to the elements shown in FIG. 1 are represented by the same reference numerals as in FIG. 1 and a description thereof is omitted herein.

A difference between FIGS. 1 and 5 is that a PMOS transistor M15 and a switch 15 are added to the switch signal generator 3. Corresponding to the difference, in FIG. 5, the switch signal generator 3 and the switching regulator 1 shown in FIG. 1 are represented as a switch signal generator 3a and a switching regulator 1a, respectively.

In FIG. 5, a switching regulator 1a is a non-isolated switching regulator employing an inductor and is configured to convert an input voltage $V_{in}$ that is input to an input terminal IN into a predetermined constant voltage and output the constant voltage as an output voltage $V_{out}$ from an output terminal OUT to a load 7.

The switching regulator 1a includes a switching transistor M1, a synchronous rectification transistor M2, a PFM/PWM controller 2, a switch signal generator 3a, a capacitor C1, and an inductor L1. The switch signal generator 3a generates and outputs a switch signal Sc for switching an operation of the PFM/PWM controller 2.

The switch signal generator 3a includes a current detector 10, a PMOS transistor M11 and an NMOS transistor M12, a constant current source 11, PMOS transistors M13, M14 and M15 that form a current mirror circuit, a capacitor C11, an inverter 12, and a switch 15.

The switch signal generator 3a forms a switch signal generation circuit. The constant current source 11, the inverter 12, the switch 15, the capacitor C11, the PMOS transistors M11, M13, M14, and M15, and the NMOS transistor M12 form a signal generation circuit. The constant current source 11, the switch 15, and the PMOS transistors M13, M14 and M15 form a constant-current circuit. In the switching regulator 1a, every element other than the inductor L1 and the capacitor C1 can be integrated onto one integrated circuit (IC). Alternatively, in the switching regulator 1a, every element other than the switching transistor M1, the synchronous rectification transistor M2, the inductor L1, and the capacitor C1 can be integrated onto one IC.

A series circuit formed by connecting the PMOS transistor M15 and the switch 15 is connected to the PMOS transistor M14 in parallel. A gate of the PMOS transistor M15 is connected to the connection point between the gates of the PMOS transistors M13 and M14, and the PMOS transistors M13, M14 and M15 form a current mirror circuit. The PFM/PWM controller 2 performs a switching operation of the switch 15 with a switch control signal S1 such that the switch 15 turns on or off in the PWM control mode or the PFM control mode, respectively. Thereby, the value of the constant current to be supplied to the capacitor C11 can be adjusted depending on the PWM control mode or the PFM control mode.

In the example circuitry shown in FIG. 5, the one series circuit formed by connecting a PMOS transistor and a switch is connected to the PMOS transistor M14 in parallel. However, it should be noted that the present invention does not limit the configuration of the switching regulator to the configuration shown in FIG. 5. Thus, alternatively, a configuration in which one or more series circuits formed by connecting a PMOS transistor and a switch in each series circuit are respectively connected to the PMOS transistor M14 in parallel can be used as well.

As described above, in the switching regulator 1a according to the second embodiment, the value of the constant current to be supplied to the capacitor C11 through the PMOS transistor M11 is adjusted depending on whether the PFM/PWM controller 2 employs the PWM control mode or the PFM control mode. Thus, an effect similar to an effect obtained in the switching regulator 1 according to the first embodiment can be obtained. At the same time, the output current $i_{out}$ that is used for the PFM/PWM controller 2 to switch the control mode of the switching regulator 1a from the PWM control mode to the PFM control mode or from the PFM control mode to the PWM control mode can be individually set.

In each of the first and second embodiments, a switching regulator of a synchronous rectification type is shown. Alternatively, the configurations described in the first and second embodiments can also be applied to a switching regulator of a non-synchronous type by using a diode instead of the synchronous rectification transistor M2. In that case, in each configuration shown in FIGS. 1, 3, 4, and 5, the synchronous rectification transistor M2 is replaced with a diode of which cathode and anode are connected to the connection point Lx and ground, respectively. Other than the diode, the configuration is the same as that shown in FIG. 1, 3, 4, or 5, and a description thereof is omitted herein.

In each of the first and second embodiments, an example in which the PFM/PWM controller 2 changes the PWM control mode and the PFM control mode is described. Alternatively, the PFM/PWM controller 2 can employ a VFM control mode instead of the PFM control mode.

It should be noted that the above-described embodiments are merely illustrative, and numerous additional modifications and variations are possible in light of the above teachings. For example, elements and/or features of different illustrative and preferred embodiments herein may be combined with each other and/or substituted for each other within the scope of this disclosure. It is therefore to be understood that the disclosure of this patent specification may be practiced otherwise than as specifically described herein.

What is claimed is:

1. A switching regulator, comprising:
   a switching transistor to switch in accordance with an input control signal;
   an inductor to be charged with an input voltage in response to a switching operation by the switching transistor;
   a switch signal generator configured to detect an inductor current flowing through the inductor from a voltage at a connection point between the switching transistor and the inductor and output a predetermined switch signal after a time in accordance with the input voltage when detecting the inductor current is zero, said switch signal generator comprising:

a current detector configured to detect the inductor current flowing through the inductor from the voltage at the connection point between the switching transistor and the inductor and output a predetermined binary detection signal when detecting the inductor current is zero; and a signal generator configured to cause the predetermined binary detection signal to be delayed for a delay time based on the input voltage, and output the predetermined binary detection signal as the switch signal when the predetermined binary detection signal is output from the current detector; and a controller configured to perform a PWM control or a PFM control on the switching transistor in accordance with the switch signal output from the switch signal generator to keep an output voltage output from the output terminal at a predetermined constant voltage, wherein the controller performs the PFM control when the predetermined switch signal is continuously input thereto from the switch signal generator one or more times.

2. The switching regulator according to claim 1, wherein the signal generator increases the delay time as the input voltage increases.

3. The switching regulator according to claim 2, wherein the signal generator comprises:
   an inverter configured to receive the detection signal output from the current detector;
   a constant-current circuit configured to supply a constant current to the inverter using the input voltage as a power supply;
   a capacitor to be charged and discharged in accordance with an output signal from the inverter; and
   a binarization circuit configured to generate the switch signal by binarizing a voltage of the capacitor.

4. The switching regulator according to claim 3, wherein a value of the constant current to be supplied to the inverter is variably set in the constant-current circuit.

5. The switching regulator according to claim 3, wherein the controller causes the constant-current circuit to adjust the value of the constant current to be supplied to the inverter in accordance with a change of control mode of the switching regulator.

* * * * *